United States Patent
Preiszler et al.

(10) Patent No.: US 9,398,399 B2
(45) Date of Patent: Jul. 19, 2016

(54) DEVICE, SYSTEM AND METHOD OF BLUETOOTH COMMUNICATION

(75) Inventors: Eitan Preiszler, D N Menashe (IL); Peter-Rafi Raskin, Haifa (IL); Ofer HaReuveni, Haifa (IL)

(73) Assignee: INTEL CORPORRATION, Santa Clara, CA (US)

( * ) Notice: Subject to any disclaimer, the term of this patent is extended or adjusted under 35 U.S.C. 154(b) by 67 days.

(21) Appl. No.: 13/976,137

(22) PCT Filed: Sep. 30, 2011

(86) PCT No.: PCT/US2011/054457
§ 371 (c)(1),
(2), (4) Date: Jun. 26, 2013

(87) PCT Pub. No.: WO2013/048511
PCT Pub. Date: Apr. 4, 2013

(65) Prior Publication Data
US 2013/0273851 A1    Oct. 17, 2013

(51) Int. Cl.
*H04B 7/08*    (2006.01)
*H04W 4/00*    (2009.01)
*H04W 84/20*    (2009.01)
*H04W 84/18*    (2009.01)

(52) U.S. Cl.
CPC ............. *H04W 4/008* (2013.01); *H04B 7/0805* (2013.01); *H04W 84/20* (2013.01); *H04W 84/18* (2013.01)

(58) Field of Classification Search
CPC .............. H04B 7/08–7/0834; H04W 4/00; H04W 4/008
USPC .......................................... 455/41.2
See application file for complete search history.

(56) References Cited

U.S. PATENT DOCUMENTS

| | | | | |
|---|---|---|---|---|
| 6,535,166 B1* | 3/2003 | Ali | .......... | 343/700 MS |
| 6,560,443 B1* | 5/2003 | Vaisanen | .................. | H01Q 3/24 455/553.1 |
| 6,978,121 B1* | 12/2005 | Lane | ...................... | H04B 1/406 455/103 |
| 7,636,560 B2* | 12/2009 | Ku | .......... | H04B 1/406 455/272 |
| 8,615,270 B2* | 12/2013 | Ibrahim | ................. | H01Q 21/29 370/338 |
| 2005/0025182 A1* | 2/2005 | Nazari | .......................... | 370/469 |
| 2005/0208900 A1* | 9/2005 | Karacaoglu | ............ | H04B 1/406 455/78 |
| 2006/0025171 A1* | 2/2006 | Ly | .......................... | H04B 1/006 455/553.1 |
| 2007/0082716 A1* | 4/2007 | Behzad et al. | ................. | 455/574 |
| 2007/0129104 A1* | 6/2007 | Sano | ..................... | H04B 7/0805 455/553.1 |
| 2009/0239471 A1 | 9/2009 | Tran et al. | | |
| 2009/0262042 A1* | 10/2009 | Li | .......................... | H04B 1/406 343/876 |

(Continued)

FOREIGN PATENT DOCUMENTS

KR    100773748 B1    11/2007

OTHER PUBLICATIONS

International Preliminary Report on Patentability and Written Opinion for PCT Patent Application No. PCT/US2011/054457, mailed on Apr. 10, 2014, 7 pages.

(Continued)

*Primary Examiner* — Gennadiy Tsvey
(74) *Attorney, Agent, or Firm* — Shichrur & Co.

(57) ABSTRACT

Some demonstrative embodiments include devices, systems and/or methods of Bluetooth communication. For example, a Bluetooth communication unit may be capable of detecting a Bluetooth signal via a first antenna, and, upon detecting the Bluetooth signal, to switch to a second antenna, which is shared between the Bluetooth communication unit and another, different, wireless communication unit, for establishing a Bluetooth communication link.

17 Claims, 3 Drawing Sheets

(56) References Cited

U.S. PATENT DOCUMENTS

| | | | |
|---|---|---|---|
| 2010/0120466 A1 | 5/2010 | Li | |
| 2010/0311339 A1* | 12/2010 | Chung et al. | 455/41.3 |
| 2011/0105026 A1* | 5/2011 | Hsiao | H04B 1/006 |
| | | | 455/41.2 |
| 2011/0319020 A1* | 12/2011 | Desai et al. | 455/41.2 |

OTHER PUBLICATIONS

IEEE Standard for Information technology—Telecommunications and information exchange between systems—Local and metropolitan area networks—Specific requirements. Part 11: Wireless LAN Medium Access Control (MAC) and Physical Layer (PHY) Specifications. IEEE Std 802.117™-2007 (Revision of IEEE Std 802.11-1999 ).

Bluetooth Specification Version 4.0; Jun. 30, 2010; 2302 pages.

International Search Report for PCT/US2011/054457, corrected version, mailed on Mar. 22, 2013; 3 pages.

International Search Report for and Written Opinion for PCT/US2011/054457, mailed on May 22, 2012; 10 pages.

Bluetooth Specification Version 1.2; Nov. 5, 2003; 1200 pages.

\* cited by examiner

DEVICE, SYSTEM AND METHOD OF BLUETOOTH COMMUNICATION

CROSS REFERENCE

This application is a National Phase Application of PCT International Application No. PCT/US2011/054457, International Filing Date Sep. 30, 2011, the entire disclosure of which is incorporated herein by reference.

BACKGROUND

A Bluetooth (BT) communication unit may communicate with at least one BT device via an antenna.

The BT device may be power constrained having a limited power source configured to supply power for long periods. For example, the BT device may be a small sensor or a watch having a battery with limited power supply, and the BT communication unit may be included as part of a notebook or a Smartphone, which may be less power constrained.

To reduce the power consumption of the BT device, the BT device may utilize a Bluetooth Low Energy (BLE) scheme to communicate with the BT communication unit, e.g., as defined by the Bluetooth specifications.

According to the BLE scheme, a first BT device ("BT peripheral device") may advertise over a BT communication channel a short transmit event, once in a relatively long time, to be detected by a second BT device ("BT central device").

In some implementations, the BT central device may establish a connection with the peripheral BT device, e.g., upon detecting the short transmit event, to enable transferring data between the BT peripheral device and the BT central device.

In some implementations, the transmit event may include data transmitted from the BT peripheral device to the BT central device. In some of these implementations, there may be no need to establish a BT connection between the BT peripheral device and the BT central device. For example, the peripheral device may include a sensor, e.g., a temperature sensor, which may periodically transmit a transmit event including data measured by the sensor, e.g., a temperature measured by the temperature sensor, to the central device.

The BT central device should be capable of scanning one or more BT frequency channels, e.g., during long scan periods, to detect the short transmit events, in order to promptly detect the transmit events. Accordingly, the BT central device may be required to use the antenna for long detection periods.

The antenna may be shared with another communication unit. For example, the antenna may be shared with a Wireless-Fidelity (WIFI) communication device, e.g., according to a Time Division Multiplexing (TDM) scheme.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
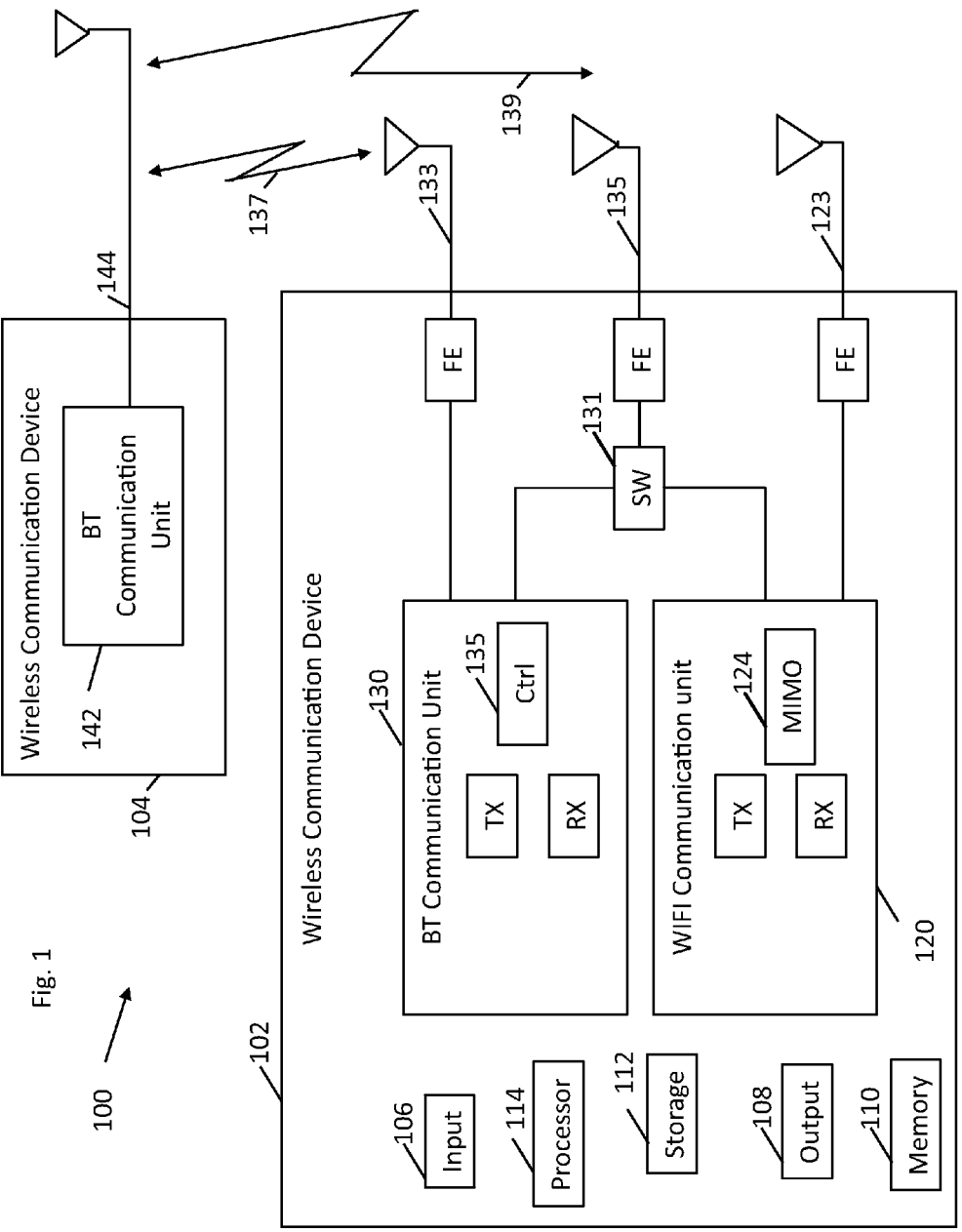
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing Bluetooth standards ("the Bluetooth standards"), e.g., including *Bluetooth specification V* 1.0, *Dec.* 1, 1991, *Bluetooth specification V* 4.0, *Jun.* 30, 2010, and/or future versions and/or derivatives thereof, devices and/or networks operating in accordance with existing IEEE 802.11 standards ("the 802.11 standards"), e.g., including IEEE 802.11 (*IEEE 802.11-2007: Standard for Information technology—Telecommunications and information exchange between systems—Local and metropolitan area networks—Specific requirements, Part* 11: *Wireless LAN Medium Access*

Control (MAC) and Physical Layer (PHY) Specifications—June 2007), and/or future versions and/or derivatives thereof, devices, and/or networks operating in accordance with IEEE 802.16 standards ("the 802.16 standards"), e.g., including 802.16 (IEEE-Std 802.16, 2004 Edition, Air Interface for Fixed Broadband Wireless Access Systems), standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

In some demonstrative embodiments, a first BT device, e.g., a BT central device, may communicate with at least one second BT device, e.g., a BT peripheral device. For example, the peripheral device may be a sensor or watch having a limited power supply and the BT central device may be included as part of a notebook or a Smartphone, which may be less power constrained.

In some demonstrative embodiments, the first BT device may communicate with the second BT device according to the Bluetooth Low Energy (BLE) communication scheme and/or architecture, e.g., as defined by the Bluetooth specifications.

For example, the second BT device may transmit a BT signal, e.g., a short advertisement event. For example, the BT signal may include a BLE advertisement event.

In some demonstrative embodiments, the first BT device may scan one or more predefined BT advertisement channels to detect the BT signal via an antenna. For example, the first BT device may scan the BT advertisement channels during long detection periods In some demonstrative embodiments, the first BT device may establish a connection with the second BT device, e.g., upon detecting the advertisement signal, to enable transferring data between the first and second BT devices.

In some demonstrative embodiments, the BT advertisement may include data transmitted from the second BT device to the first BT device. In some embodiments, there may be no need to establish a BT connection between the first and second BT devices. For example, the second BT device may include a sensor, e.g., a temperature sensor, which may periodically transmit a transmit event including data measured by the sensor, e.g., a temperature measured by the temperature sensor, to the first BT device device.

In some demonstrative embodiments, the antenna may be shared with an other, different, wireless communication unit. For example, the antenna may be shared with a Wireless Fidelity (WIFI) communication unit, e.g., as described in detail below.

In some demonstrative embodiments, the other wireless communication unit may perform multiple-in-multiple-out (MIMO) communication via a plurality of antennas including the antenna.

In some demonstrative embodiments, the utilization of the shared antenna by the first BT device during the long scanning and/or detection periods may prevent and/or reduce the efficiency of communication by the other wireless communication unit.

In some demonstrative embodiments, the first BT device may utilize an other antenna to scan the one or more BT channels to detect the BT signal.

In some demonstrative embodiments, upon detecting the BT signal, the first BT device may switch to the shared antenna to establish a BT communication link with the second BT device, e.g., as described in detail below.

In some demonstrative embodiments, the first BT device may be capable of scanning the BT channels to detect the BT signal via the other antenna, while the other communication unit communicates via the shared antenna. For example, the first BT device may be capable of scanning the BT channels to detect the BT signal via the other antenna, while the WIFI communication unit performs MIMO via a plurality of antennas including the shared antenna to communicate with other WIFI devices, e.g., as described in detail below.

Reference is now made to FIG. 1, which schematically illustrates a block diagram of a wireless communication system 100, in accordance with some demonstrative embodiments.

In some demonstrative embodiments, system 100 may include one or more devices, e.g., devices 102 and 104, capable of communicating wireless communication signals over a BT communication channel.

In some demonstrative embodiments, wireless communication devices 102 and/or 104 may include BT communication units 130 and/or 142, respectively, to perform BT wireless communication over the BT channel, e.g., as described below.

In some demonstrative embodiments, BT communication units 130 and/or 142 include, for example, one or more BT wireless transmitters, receivers and/or transceivers able to send and/or receive BT wireless communication signals, frames, blocks, transmission streams, packets, messages, data items, and/or data.

In some demonstrative embodiments, wireless communication device 104 may include, or may be associated with, at least one antenna 144. Antenna 144 may include any type of antenna suitable for transmitting and/or receiving BT wireless communication signals, blocks, frames, transmission streams, packets, messages and/or data. For example, antenna 144 may include any suitable configuration, structure and/or arrangement of one or more antenna elements, components, units, assemblies and/or arrays.

In some demonstrative embodiments, wireless communication device 104 may be power constrained, e.g., having a limited power source, compared to device 102. For example, wireless communication device 104 may include or may be part of a small sensor or a watch having a battery with limited power supply.

In some demonstrative embodiments, device 102 may include, or may be included as part of, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication device 102 may include a WIFI communication unit 120 configured to communicate with one or more other WIFI communication devices, e.g., as described below.

In some demonstrative embodiments, device 102 may also include, for example, one or more of a processor 114, an input unit 106, an output unit 108, a memory unit 110, and a storage unit 112. Device 102 may optionally include other suitable hardware components and/or software components. In some embodiments, some or all of the components of device 102 may be enclosed in a common housing, chip or packaging, and may be interconnected or operably associated using one or more wired or wireless links. In other embodiments, components of device 102 may be distributed among multiple or separate devices or locations.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication device 102 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication device 102.

In some demonstrative embodiments, BT communication units 130 and 142 may communicate according to a Bluetooth Low Energy (BLE) scheme and/or architecture, e.g., as defined by the Bluetooth specifications.

In some demonstrative embodiments, BT communication unit 142 may transmit a BT signal 137 via antenna 144. In one example, once in a relatively long time period, e.g., to reduce power consumption of device 104. For example, signal 137 may include a BLE advertisement signal.

In some demonstrative embodiments, device 102 may include a first antenna 133 configured to detect signal 137, and at least one second antenna 135 configured to communicate with BT communication unit 142. Antenna 135 may be shared between BT communication unit 130 and WIFI communication unit 120.

In some demonstrative embodiments, BT communication unit 130 may be capable of scanning one or more BT channels to detect signal 137 via antenna 133, e.g., during relatively long scanning periods.

In some demonstrative embodiments, BT communication unit 130 may switch between first antenna 133 to second antenna 135 upon detecting BT signal 137, to establish a BT communication link 139 between BT communication units 142 and 130. BT communication unit 130 may then perform BT communication over BT communication link 139 via antenna 135.

In some demonstrative embodiments, BT communication unit 130 may utilize antenna 133 to scan one or more BT channels to detect a BT signal, e.g., a BT advertisement signal, from one or more BT devices; and BT communication unit 130 may utilize antenna 133 to establish a BT communication link with one or more other BT devices. For example, BT communication unit 130 may utilize antenna 133 to detect a BT advertisement including data from a first BT device, for example, a sensor, e.g., a temperature sensor, which may periodically transmit a BT advertisement including data measured by the sensor, e.g., a temperature measured by the temperature sensor. BT communication unit 130 may utilize antenna 133 to detect a second BT device, and, upon detecting the second BT device, BT communication unit 130 may switch to antenna 135 to establish a communication link with the second BT device.

In some demonstrative embodiments, BT communication unit 130 may include a controller 135 configured to control which antenna may be used by BT communication unit 130. For example, upon detecting signal 137 via first antenna 133, controller 135 may switch between the antennas, from first antenna 133 to second antenna 135, e.g., as described above.

In some demonstrative embodiments, antenna 133 may have degraded functionality compared to antenna 135. For example, antenna 133 may include a stub antenna. For example, antenna 133 may include a partially matched trace on a printed circuit board. The degraded functionality of antenna 133 may enable to reduce cost and/or to increase simplicity of device 102.

In some demonstrative embodiments, the degraded functionality of antenna 133 may not affect the efficiency of detecting signal 137. For example, signal 137 may be transmitted at high power and/or at frequencies, which may be easily detected by a stub antenna and/or may not be interfered by the communication of WIFI communication unit 120, e.g., as described below with reference to FIG. 2.

In some demonstrative embodiments, BT communication unit 130 may detect BT signal 137 via antenna 133, for example, while WIFI communication unit 120 may communicate with other WIFI devices via antenna 135.

In some demonstrative embodiments, wireless communication device 102 may include a switch 131 configured to switch the connection of antenna 135 between WIFI communication unit 120 and BT communication unit 130. For example, upon detecting signal 137, switch 131 may switch antenna 135 from WIFI communication unit 120 to BT communication unit 130

In some demonstrative embodiments, WIFI communication unit 120 may include a MIMO controller 124 configured to perform multiple-input-multiple-output (MIMO) communication via a plurality of antennas including antenna 135. For example, WIFI communication unit 120 may perform MIMO communication via antenna 135 and via a third antenna 123.

Figure 2:
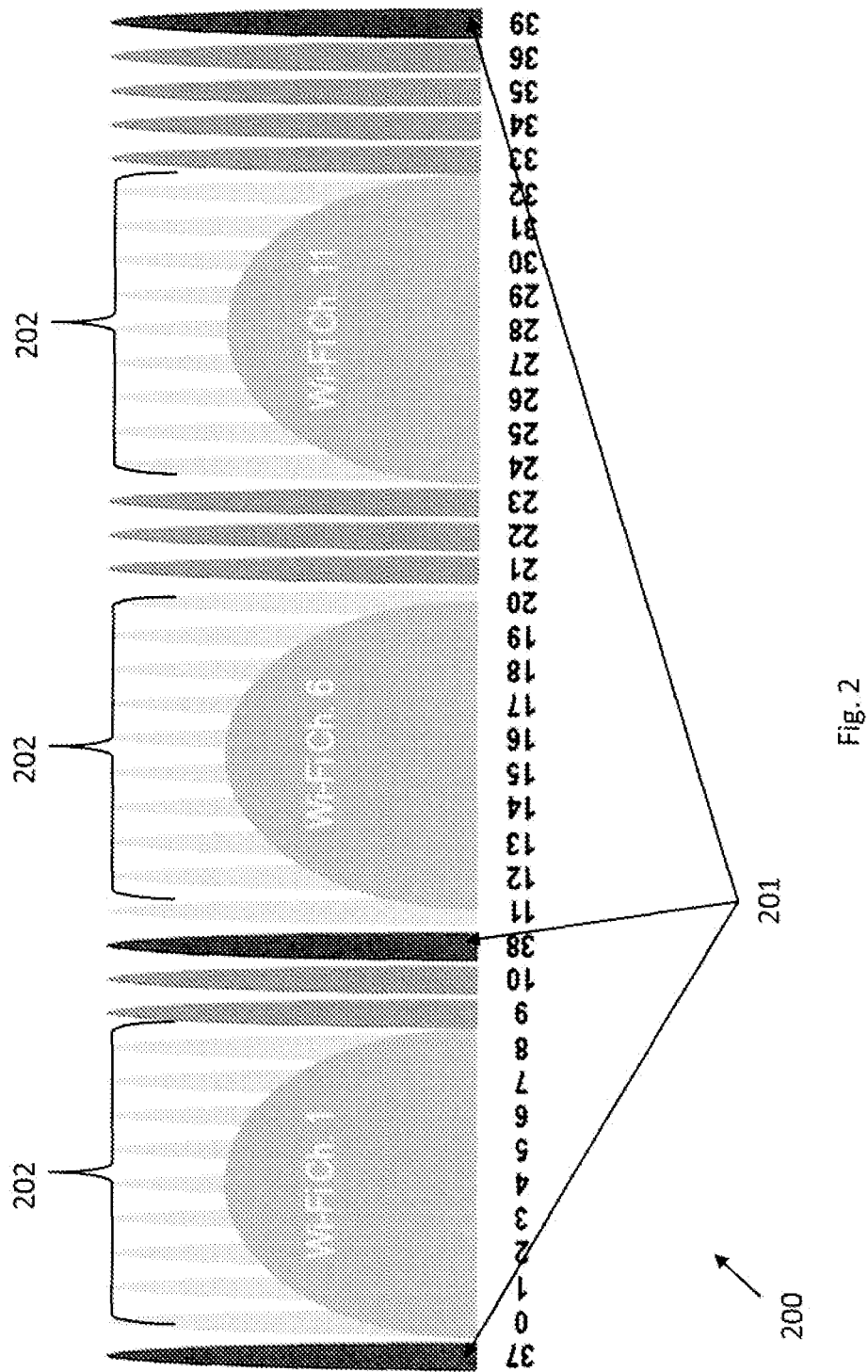
FIG. 2 is a schematic illustration of a channel frequency spectrum, in accordance with some demonstrative embodiments.

Reference is now made to FIG. 2, which schematically illustrates a channel frequency spectrum 200, in accordance with some demonstrative embodiments.

As shown in FIG. 2, spectrum 200 includes a plurality of WIFI communication channels 202, which may be used by a WIFI communication unit, e.g., WIFI communication unit 120 (FIG. 1).

As also shown in FIG. 2, BLE advertisement events 201, e.g., signal 137 (FIG. 1), may be transmitted over one of one or more BLE frequency advertisement frequency channels 201.

As shown in FIG. 2, BLE advertisement events 201 are transmitted at high peak power and at the frequencies, which are different from, and do not overlap, WIFI communication channels 202. Accordingly, a stub antenna, e.g., antenna 133, may be capable of detecting events 201, e.g., even during WIFI transmissions over channels 202.

Figure 3:
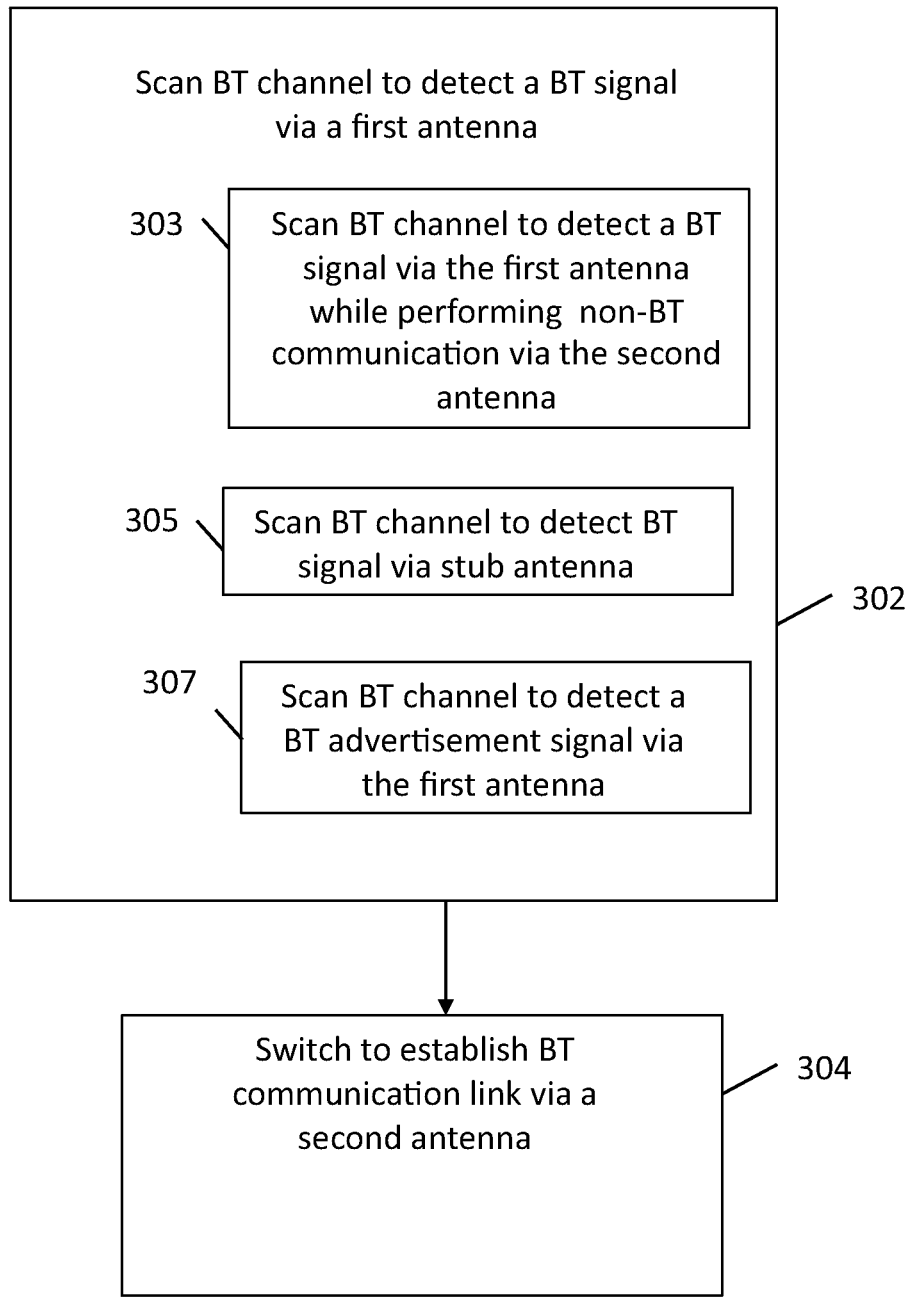
FIG. 3 is a schematic flow-chart illustration of a method of Bluetooth communication, in accordance with some demonstrative embodiments.

Reference is now made to FIG. 3, which schematically illustrates a method of Bluetooth communication, in accordance with some demonstrative embodiments. In some demonstrative embodiments, one or more of the operations of the method of FIG. 3, may be performed by any suitable wireless communication system, e.g., system 100 (FIG. 1); wireless communication device, e.g., device 102 (FIG. 1); and/or BT communication unit, e.g., BT communication unit 130 (FIG. 1).

As indicated at block 302, the method may include scanning a BT channel to detect a Bluetooth (BT) signal via a first antenna. For example, BT communication unit 130 (FIG. 1) may scan one or more BT advertisement channels to detect BT signal 137 (FIG. 1) via antenna 133 (FIG. 1) e.g., as described above.

As indicated at block 304, the method may include switching to establish a BT communication link via a second antenna upon detecting the BT signal. For example, BT communication unit 130 (FIG. 1) may switch to second antenna 135 (FIG. 1) to establish BT communication link 139 (FIG. 1) between BT communication units 130 and 142 (FIG. 1), e.g., as described above.

As indicated at block 303, detecting the BT signal via the first antenna may include detecting the BT signal via the first antenna while performing a non-BT communication via the second antenna. For example, BT communication unit 130 (FIG. 1) may detect signal 137 via antenna 133, while WIFI communication unit 120 may perform WIFI communication via second antenna 135 (FIG. 1), e.g., as described above.

As indicated at block 305, detecting the BT signal via the first antenna may include detecting the BT signal via a stub antenna. For example, antenna 133 (FIG. 1) may include a stub antenna, e.g., as described above.

As indicated at block 307, detecting the BT signal via the first antenna may include detecting a BLE advertisement event signal via the first antenna. For example, signal 137 (FIG. 1) may include a BLE advertisement signal, e.g., as described above.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:
1. A device comprising:
a Bluetooth transceiver comprising a receiver, a transmitter, and a controller, the controller configured to connect the receiver to a first antenna, which is dedicated for detecting a Bluetooth signal, and
the controller is configured to, upon detecting said Bluetooth signal via the first antenna, cause said Bluetooth transceiver to switch to communicate via a second antenna, having improved performance compared to the first antenna, to establish a Bluetooth communication link,
said second antenna is shared between said Bluetooth transceiver and an other, a different, non-Bluetooth wireless transceiver,
said controller is configured to, upon detecting said Bluetooth signal, cause a switch component to switch a connection of the second antenna from the other non-Bluetooth wireless transceiver to the Bluetooth transceiver,
wherein said Bluetooth transceiver is to detect said Bluetooth signal via the first antenna when said non-Bluetooth wireless transceiver is communicating via said second antenna.
2. The device of claim 1, wherein said first antenna comprises a stub antenna.
3. The device of claim 1, wherein said Bluetooth transceiver is to detect said Bluetooth signal when said other non-Bluetooth wireless transceiver performs multiple-input- multiple-output (MIMO) communication via a plurality of antennas including said second antenna.

4. The device of claim 1, wherein said Bluetooth signal comprises a Bluetooth advertisement signal.

5. The device of claim 4, wherein said Bluetooth advertisement signal comprises a Bluetooth Low Energy (BLE) advertisement signal.

6. The device of claim 1, wherein said other non-Bluetooth wireless transceiver comprises a Wireless-Fidelity (Wi-Fi) transceiver.

7. A system comprising:
a device including:
a first, Bluetooth, wireless transceiver comprising a receiver, a transmitter and a controller;
a second, non-Bluetooth, wireless transceiver;
a first antenna;
a second antenna shared between said first and second wireless transceivers, the first antenna having degraded functionality compared to the second antenna, said first antenna configured to detect Bluetooth signals, and said second antenna configured to communicate both Bluetooth communication signals as well as non-Bluetooth communication signals,
a switch component configured to switch a connection of the second antenna between the first wireless transceiver and the second wireless transceiver; and
wherein said controller is configured to connect the first wireless transceiver to the first antenna for detecting a Bluetooth signal via said first antenna, and, upon detecting said Bluetooth signal, said controller is to cause the first wireless transceiver to switch to communicate via said second antenna to establish a Bluetooth communication link, said controller is configured to cause the switch component to connect the second antenna to the second wireless transceiver when the first wireless transceiver is to scan for the Bluetooth signal, and, upon detecting said Bluetooth signal, to cause the switch component to switch a connection of the second antenna from the second wireless transceiver to the first wireless transceiver,
wherein said first wireless transceiver is to detect said Bluetooth signal when said second wireless transceiver is communicating via said second antenna.

8. The system of claim 7, wherein said first antenna comprises a stub antenna.

9. The system of claim 7, wherein said second wireless transceiver is configured to perform multiple-input-multiple-output (MIMO) communication via a plurality of antennas including said second antenna.

10. The system of claim 7, wherein said Bluetooth signal comprises a Bluetooth advertisement signal.

11. The system of claim 10, wherein said Bluetooth advertisement signal comprises a Bluetooth Low Energy (BLE) advertisement signal.

12. The system of claim 7, wherein said second wireless transceiver comprises a Wireless-Fidelity (Wi-Fi) transceiver.

13. A method to be performed at a Bluetooth transceiver, the method comprising:
connecting a first, Bluetooth, transceiver to a first antenna dedicated to detect a Bluetooth signal;
causing a switch component to connect a second antenna to a second, non-Bluetooth, transceiver;
while the second transceiver is communicating via the second antenna, scanning a Bluetooth channel for detecting the Bluetooth signal at the first transceiver via the first antenna; and
upon detecting said Bluetooth signal via the first antenna, causing the switch component to switch the second antenna from the second transceiver to said first transceiver, and switching the first transceiver from the first antenna to communicate via the second antenna to establish a Bluetooth communication link.

14. The method of claim 13, wherein said non-Bluetooth communication comprises a multiple-input-multiple-output (MIMO) communication via a plurality of antennas including said second antenna.

15. The method of claim 13, wherein said first antenna comprises a stub antenna.

16. The method of claim 13, wherein said Bluetooth signal comprises a Bluetooth advertisement signal.

17. The method of claim 16, wherein said Bluetooth advertisement signal comprises a Bluetooth Low Energy (BLE) advertisement signal.

* * * * *